(12) United States Patent
Mitra et al.

(10) Patent No.: US 10,654,745 B2
(45) Date of Patent: May 19, 2020

(54) HIGH-EXPANSION BONDING GLASS HAVING IMPROVED WATER RESISTANCE AND USES THEREOF

(71) Applicant: Schott AG, Mainz (DE)

(72) Inventors: Ina Mitra, Stadecken-Elsheim (DE); Miriam Kunze, Neustadt am Rübenberg (DE); Linda Johanna Bartelt, Landshut (DE); Sabrina Wimmer, Altdorf (DE); Frank Kroll, Landshut (DE); Hauke Esemann, Wörrstadt (DE); Bernd Hoppe, Ingelheim (DE); Jörg Witte, Pfungstadt (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 16/117,842

(22) Filed: Aug. 30, 2018

(65) Prior Publication Data

US 2019/0084871 A1     Mar. 21, 2019

(30) Foreign Application Priority Data

Sep. 15, 2017   (DE) .................. 10 2017 216 422

(51) Int. Cl.
*C03C 8/08*     (2006.01)
*C03C 8/24*     (2006.01)
(Continued)

(52) U.S. Cl.
CPC ................ *C03C 8/08* (2013.01); *C03C 3/064* (2013.01); *C03C 3/066* (2013.01); *C03C 3/19* (2013.01);
(Continued)

(58) Field of Classification Search
CPC .................................. C03C 8/08; C03C 8/24
See application file for complete search history.

(56) References Cited

U.S. PATENT DOCUMENTS

| 5,262,364 A | 11/1993 | Brow et al. |
| 5,965,469 A | 10/1999 | Kilgo et al. |

(Continued)

FOREIGN PATENT DOCUMENTS

| WO | 2012/110243 A1 | 8/2012 |
| WO | 2012/110247 A1 | 8/2012 |

OTHER PUBLICATIONS

Translation of the Japanese Notification of Reasons for Refusal (type 1 office action) dated Nov. 12, 2018 for Japanese Patent Application No. 2018-163179 (6 pages).

(Continued)

*Primary Examiner* — Karl E Group
(74) *Attorney, Agent, or Firm* — Taylor IP, P.C.

(57) ABSTRACT

The present disclosure relates to a bonding glass which has improved water resistance and has a coefficient of thermal expansion $\alpha(25\text{-}300)$ of from $14\cdot10^{-6}K^{-1}$ to $17\cdot10^{-6}K^{-1}$, comprising, in mol % on an oxide basis, 5-7 of $B_2O_3$, 10-14 of $Al_2O_3$, 36-43 of $P_2O_5$, 15-22 of $Na_2O$, 12.5-20 of $K_2O$, 2-6 of $Bi_2O_3$ and >0-6 of R oxide, where R oxide is an oxide selected from the group consisting of $MnO_2$ and $SiO_2$ and $SnO_2$ and $Ta_2O_5$ and $Nb_2O_5$ and $Fe_2O_3$ and $GeO_2$ and $CaO$. The bonding glass is free of PbO except for, at most, impurities. The bonding glass may have a glass transition temperature Tg of from 390° C. to 430° C. The present disclosure also relates to uses of this bonding glass.

25 Claims, 1 Drawing Sheet

(51) Int. Cl.
    *C03C 27/02*     (2006.01)
    *C03C 3/19*     (2006.01)
    *C03C 4/20*     (2006.01)
    *C03C 3/064*     (2006.01)
    *C03C 3/066*     (2006.01)
    *C03C 3/253*     (2006.01)

(52) U.S. Cl.
    CPC ............... *C03C 3/253* (2013.01); *C03C 4/20* (2013.01); *C03C 8/24* (2013.01); *C03C 27/02* (2013.01); *C03C 2207/04* (2013.01); *C03C 2207/08* (2013.01); *C03C 2207/10* (2013.01)

(56) References Cited

U.S. PATENT DOCUMENTS

| | | | | |
|---|---|---|---|---|
| 9,527,157 | B2* | 12/2016 | Kroll | C03C 3/19 |
| 9,539,665 | B2* | 1/2017 | Kroll | C03C 3/19 |
| 9,614,199 | B2 | 4/2017 | Hartl | |
| 9,616,518 | B2* | 4/2017 | Kroll | C03C 3/19 |
| 9,799,860 | B2* | 10/2017 | Kroll | C03C 3/19 |
| 2003/0134194 | A1 | 7/2003 | Lasater | |
| 2013/0330600 | A1* | 12/2013 | Goedeke | C03C 3/19 429/163 |
| 2013/0337316 | A1* | 12/2013 | Kroll | C03C 3/19 429/181 |
| 2017/0098803 | A1* | 4/2017 | Kroll | C03C 3/19 |
| 2017/0149028 | A1* | 5/2017 | Kroll | B23K 26/206 |
| 2018/0169785 | A1* | 6/2018 | Goedeke | C03C 3/19 |
| 2018/0178312 | A1* | 6/2018 | Kroll | C03C 3/19 |

OTHER PUBLICATIONS

"Schott Guide to Glass", Second Edition, 1996, Chapman & Hall, pp. 18-21 (2 pages).

R. Görke, K.J. Leers: Keram.Z.48 (1996), "Automatisierung eines Erhitzungsmikroskops mit Hilfe digitaler Bildverarbeitung", pp. 300-305 (5 pages).

German Office Action dated Apr. 17, 2018 for German Application No. 10 2017 216 422.0 (5 pages).

* cited by examiner

HIGH-EXPANSION BONDING GLASS HAVING IMPROVED WATER RESISTANCE AND USES THEREOF

BACKGROUND OF THE INVENTION

1. Field of the Invention

The present disclosure relates to a bonding glass having a high thermal expansion, such as a high-expansion phosphate glass, which is suitable for joining components composed of metal, such as lightweight metal, and also to joints comprising this bonding glass and uses thereof.

2. Description of the Related Art

Bonding glasses are known for forming, e.g., glass-to-metal seals in feedthroughs. Phosphate glasses make up one such class of bonding glass.

A disadvantage of all phosphate glasses known from the prior art is their low resistance, or resistance requiring improvement, to moisture, i.e. their water resistance. However, resistance to moisture is required and of critical importance in many applications. When high-expansion phosphate glasses are used in feedthroughs for storage devices and also batteries and capacitors, resistance to moisture in particular plays an important role. This applies particularly to the humidity of the ambient air or wetting with water.

What is needed in the art is a bonding glass with improved water resistance compared to known bonding glasses.

SUMMARY OF THE INVENTION

The bonding glass of the present disclosure has an improved water resistance compared to known bonding glasses. This is particularly useful when the joints produced therewith are exposed to environmental influences and/or water-containing substances, such as reaction carriers and/or electrolytes. The same applies to water vapour.

A glass or bonding glass in the meaning of this disclosure is an amorphous compound of the individual glass components. For the purposes of the present disclosure, crystalline regions can be present therein. The bonding glass can also be referred to as inorganic multicomponent glass. The bonding glass is free of PbO except for, at most, impurities, such as unavoidable impurities. Impurities can be introduced by the natural contamination of raw material components and/or via residues in the installations used for producing the bonding glass. The maximum amount of these impurities is usually not more than 1,000 ppm, such as not more than 600 ppm. PbO should not be present in the bonding glass of the present disclosure because PbO is environmentally problematical and the bonding glass of the present disclosure should, due to the absence of PbO, also make a contribution to the environmental friendliness of the products produced therewith. The bonding glass may also be free of BaO except for, at most, impurities. An upper limit for BaO contamination may be, 1,000 ppm, such as 500 ppm or 100 ppm. Under particular operating conditions, contact regions of BaO with metals as joining partners are observed, which can weaken the joint.

The bonding glass has a coefficient of linear thermal expansion $\alpha(25\text{-}300)$ at 25° C. to 300° C. of from $14 \cdot 10^{-6}$ $K^{-1}$ to $17 \cdot 10^{-6} K^{-1}$. This makes it suitable for producing joints, particularly to lightweight metals, which likewise have a high coefficient of thermal expansion. The bonding glass may have a glass transition temperature Tg of from 390° C. to 430° C. Tg can be measured easily using known methods. The melting temperature, which is relevant for the production of glass-metal joints, is significantly more difficult to determine. It is always higher than Tg, but is comparatively low for the bonding glasses of the present disclosure and thus, likewise, allows use for joining lightweight metals, which usually have a low melting point. Since Tg is simpler to measure, Tg is employed as an indication of the melting temperature. To produce a joint, the melting temperature of the bonding glass should be below the melting point of the metallic joining partner, such as below the melting point of the lightweight metal(s) used.

Exemplary embodiments of the bonding glass formed according to the present disclosure contain, in mol % on an oxide basis, 4-8% of $B_2O_3$ such as 5-7% of $B_2O_3$, 10-14% of $Al_2O_3$, 36-43% of $P_2O_5$, 15-22% of $Na_2O$ 12.5-20% of $K_2O$, 2-6% of $Bi_2O_3$ and a total of >0-4% of at least one additional oxide, referred to as R oxide. This means that R oxide is present in a proportion of more than 0% in the bonding glass.

All contents indicated are, unless indicated otherwise, in mol % on an oxide basis.

R oxide is individually, or in any combination, $MnO_2$ and/or $SiO_2$ and/or $SnO_2$ and/or $Ta_2O_5$ and/or $Nb_2O_5$ and/or $Fe_2O_3$ and/or $GeO_2$.

Exemplary embodiments of bonding glass of the present disclosure have a coefficient of thermal expansion $\alpha(25\text{-}300)$ in the range from $14 \cdot 10^{-6} K^{-1}$ to $17 \cdot 10^{-6} K^{-1}$, such as from $15 \cdot 10^{-6} K^{-1}$ to $17 \cdot 10^{-6} K^{-1}$. This makes it capable of producing joints to high-expansion metals, such as lightweight metals and/or high-expansion stainless steels.

It has been discovered that the water resistance of exemplary embodiments of bonding glass formed according to the present disclosure is surprisingly improved significantly by the presence, according to the present disclosure, of $Bi_2O_3$ and the indicated R oxide. It is presumed that the $Bi_2O_3$ and R oxide act synergistically and form, at least in regions in the glass matrix, connected regions which stabilize the glass microstructure so that ions can less easily be leached from the glass matrix in the case of attack by water; this was not foreseeable from the prior art.

Phosphate glasses have become known, for example, from WO 2012/110247 A1. The phosphate glasses known from WO 2012/110247 A1 are solder glasses which are used for joining metals having high thermal expansion and low melting points to one another, for example by soldering. $Bi_2O_3$ is not present in the PbO-free variants. Likewise, no mention is made of R oxide. WO 2012/110247 A1 therefore provides no indication for bonding glasses corresponding to bonding glasses formed according to the present disclosure, in particular not to the improvement in the water resistance achieved thereby.

WO 2012/110243 A1 discloses phosphate glass solders which can contain $Bi_2O_3$. It has been found that these materials can likewise suffer attacks by water under particular operating conditions and/or fields of application. In particular, the materials disclosed in WO 2012/110243 A1 do not disclose any R oxide.

Further glass solders based on phosphate glass have become known from many documents. For example, U.S. Pat. No. 5,262,364 A describes a high-expansion glass solder comprising 10 to 25 mol % of $Na_2O$, 10-25 mol % of $K_2O$, 5-15 mol % of $Al_2O_3$, 35-50 mol % of $P_2O_5$, 5-15 mol % of PbO and/or BaO. The glass solder disclosed in U.S. Pat. No. 5,262,364 has a thermal expansion $\alpha$ in the range from $16 \cdot 10^{-6} K^{-1}$ to $21 \cdot 10^{-6} K^{-1}$. A disadvantage of the solder according to U.S. Pat. No. 5,262,364 was, among other things, that the glass solder necessarily contained PbO or BaO and also a relatively high proportion of $Na_2O$. The glass solder of U.S. Pat. No. 5,262,364 does not contain any $Bi_2O_3$ and has comparatively poor water resistances.

U.S. Pat. No. 5,965,469 A discloses a lead-free, high-expansion glass solder or fusion glass for use in a hermetic housing for high-frequency applications. The lead-free high-expansion PbO-free glass solder known from U.S. Pat. No. 5,965,469 A comprises, in the examples, 7.5-12 mol % of $Al_2O_3$ and 40-50 mol % of $P_2O_5$. $Bi_2O_3$ is not mentioned. These materials thus tend to have relatively high $Al_2O_3$ and $P_2O_5$ contents and do not suggest any interaction of $Bi_2O_3$ and R oxide in order to improve the water resistance.

In the case of a bonding glass produced according to the present disclosure, the improved resistance to moisture is, as presumed and described above, achieved by the interaction of $Bi_2O_3$ and R oxide. R oxide comprises, as described, at least one of the oxides CaO, $MnO_2$, $SiO_2$, $Ta_2O_5$, $SnO_2$, $Nb_2O_5$, $Fe_2O_3$, $GeO_2$ and any combinations thereof, which are, as described, always present in combination with $Bi_2O_3$. $MnO_2$, $Ta_2O_5$ and $Nb_2O_5$ appear to have the greatest effect on an improved water resistance. $SiO_2$ improves not only the water resistance but also the rational producibility of the bonding glass and the acid resistance thereof. However, $SiO_2$ also increases the melting temperature. Properties of the bonding glass which are relevant to the product to be produced therewith can thus be influenced by selection of the constituents of R oxide and/or combinations thereof.

In some exemplary embodiments, the bonding glass comprises 3.0-6 mol % of $MnO_2$ to achieve good water resistance, which has been confirmed experimentally. $MnO_2$ can be present in a proportion of 3.2-4.9 mol %, such as 3.4-4.9 mol %. As experiments have shown, the content of $MnO_2$ improves the adhesion of the bonding glass to lightweight metals, in particular to aluminum and/or aluminum alloys. Hermetically sealed joints to lightweight metals, in particular aluminum and/or aluminum alloys, can thus be produced particularly rationally. There are also indications that the same holds true for titanium and/or titanium alloys.

In some embodiments, the bonding glass contains $SiO_2$, as an alternative to or in addition to the abovementioned components, in an amount of 0.01-1.8 mol %, such as 0.01-1.6 mol %. With these contents, bonding glasses having good water resistance can be produced. The resistance to electrolyte solutions as are employed, for example, in capacitors and/or batteries and/or rechargeable batteries is likewise good.

In addition or as an alternative, 0-0.3% of CaO and/or 3.5-4.7% of $MnO_2$ and/or 0.01-1.1% of $SiO_2$ may be present as R oxide.

In some embodiments, the bonding glass contains as R oxide, as an alternative to or in addition to the abovementioned R oxides, 0.01-2.8 mol % of $GeO_2$ and/or 0.01-2.4 mol % of $SnO_2$ and/or 0.01-2.1 mol % of $Fe_2O_3$ and/or 0.01-2.2 mol % of $Ta_2O_5$ and/or 0.01-2.0 mol % of $Nb_2O_5$ and/or 0.01-0.4 mol % of CaO.

In some embodiments, the bonding glass contains, in mol % on an oxide basis, 36-<42% of $P_2O_5$, such as 37.6-39.9%. In some embodiments the bonding glass contains, in mol % on an oxide basis, 5.5-6.8% of $B_2O_3$, 11.4-12.8% of $Al_2O_3$, 15.4-20.9% of $Na_2O$ 12.8-19.8% of $K_2O$, 2.5-4.5% of $Bi_2O_3$.

All ranges mentioned in the present description can be combined, individually or in any combination, with the abovementioned ranges of the respective other components.

The molar portion of alkali metal oxides may be restricted to a maximum of 36 mol %, such as restricted to a maximum of 35 mol %. This applies to all ranges mentioned. A contribution to the improved water resistance can be achieved thereby. However, it has been recognized that alkali metal oxides are likewise required in order to achieve the high thermal expansion of the bonding glass. This gives a conflict of objectives, which is countered according to the present disclosure by incorporating, in some embodiments, a minimum content of alkali metal oxides of 32 mol %. The lower limit for the content of the alkali metals is 27.5 mol %. In some embodiments the content of alkali metal oxides is at least 30 mol %, such as at least 31 mol % or at least 33 mol %.

In some embodiments, the bonding glass is free of $Cs_2O$ except for, at most, impurities. An upper limit of 500 ppm or 200 ppm can be given as the upper limit to this contamination.

The bonding glass described herein has a coefficient of thermal expansion $\alpha(25-300)$ in the range from $14 \cdot 10^{-6} K^{-1}$ to $17 \cdot 10^{-6} K^{-1}$, such as from $15 \cdot 10^{-6} K^{-1}$ to $17 \cdot 10^{-6} K^{-1}$. The thermal expansion of the glass material is thus of the order of magnitude of that of customary metals, such as aluminum ($\alpha \approx 23 \cdot 10^{-6} K^{-1}$) or copper ($\alpha \approx 16.5 \cdot 10^{-6} K^{-1}$). There are high-expansion stainless steels whose thermal expansion is also from about $10 \cdot 10^{-6} K^{-1}$ to $17 \cdot 10^{-6} K^{-1}$. The high-expansion steels from among these stainless steels can likewise be joined to the bonding glass described herein, such as when the bonding glass is selected so that its thermal expansion is greater than that of the respective stainless steel.

The glass transition temperature Tg as is defined, for example, in "Schott Guide to Glass, Second Edition, 1996, Chapman & Hall, pages 18-21", may be in the range from 390° C. to 430° C. This allows, as described above, joining to the metals described, and secondly heat resistance during operation of a device produced using the bonding glass is also provided. For example, the bonding glass can be used in battery housings and/or rechargeable battery housings. In the event of a high power draw or a short circuit, high temperatures arise and the bonding glass is able to withstand these when particular design parameters of the housing are adhered to. In other words, the bonding glass described herein makes it possible for the housing and/or battery manufacturer to realize batteries and/or rechargeable batteries and/or capacitors and/or supercapacitors which, even in the case of a short circuit, have increased safety.

In some embodiments, the glasses have not only a glass transition temperature Tg in the range from 390° C. to 430° C. but also a fusion temperature of less than 600° C. For the purposes of the present disclosure, the fusion temperature or melting temperature or soldering temperature of the glass or the glass-ceramic is the temperature of the glass or the glass-ceramic at which the glass material softens and thus lies tightly against the metal to be fused to the glass material, so as to give a joint between the glass or the glass-ceramic and the metal. The fusion temperature can, for example, be determined via the hemisphere temperature as described in R. Görke, K.-J. Leers: Keram. Z.48 (1996) 300-305 or in accordance with DIN 51730, ISO 540 or CEN/TS 15405 and 15370-1, the disclosure contents of which are incorporated by reference in their entirety into the present disclosure. The measurement of the hemisphere temperature is explained comprehensively in DE 10 2009 011 182 A1, the disclosure content of which is incorporated by reference in its entirety into the present disclosure. According to DE 10 2009 011 182 A1, the hemisphere temperature can be determined by a microscopic method using a hot-stage microscope. It characterizes the temperature at which an originally cylindrical test specimen has melted to form a hemispherical mass. The hemisphere temperature can be assigned a viscosity of about $\log \eta = 4.6$ dPas, as can be derived from the literature.

If a crystallization-free glass, for example in the form of a glass powder, is melted and cooled again so that it solidifies, it can usually be remelted at the same melting temperature. In the context of a joint involving a crystallization-free glass, this means that the operating temperature to which the joint can be exposed in the long term must be no higher than the fusion temperature applied for the production of the component and may also be no higher than the glass transition temperature Tg, which is lower than the melting temperature, in order to ensure mechanical stability of the component.

In some embodiments, the bonding glass has crystalline regions which comprise phosphate-containing crystal phases. The crystal phases can, in particular, arise in the fusion process of the glass with the joining partner. The material comprising the crystal phases has a melting point higher than that of the original material. This makes it possible for the maximum operating temperature to be higher than the melting temperature.

The crystal phases may comprise crystals of a $Bi_2O_3$—$P_2O_5$ system and/or $R_2O$—$Al_2O_3$—$P_2O_5$ system, such as a $K_2O$—$Al_2O_3$—$P_2O_5$ system.

Glass compositions as are used for the present purposes are generally often produced from a glass powder which is melted and, under the action of heat, provides the joining connection, or short joint, to the components to be joined. The fusion temperature or melting temperature generally corresponds approximately to the magnitude of the hemisphere temperature of the glass. Glasses having relatively low fusion temperatures or melting temperatures are also referred to as glass solders. In such a case, the term "solder temperatures" or "soldering temperatures" is used instead of fusion or joining or melting temperatures. The fusion temperature or solder temperature can deviate by ±20 K from the hemisphere temperature.

The previously described glass is solderable or fusible under normal atmospheres with, for example, Al (including aluminum alloys) and/or Ti (including titanium alloys) and/or Cu. The glasses of the present disclosure are suitable for contact with aggressive, fluorine-containing media as are used, for example, as electrolytes in lithium-ion batteries.

The bonding glasses or glass compositions formed in accordance with the present disclosure have a high chemical resistance to water-containing electrolytes and also non-aqueous battery electrolytes, such as battery electrolytes comprising carbonates, which may be carbonate mixtures with an electrolyte salt, which may, for example, comprise $LiPF_6$.

The present disclosure provides not only the bonding glass but also a composite of the bonding glass with a metal. Such a composite is usually referred to as glass-metal composite. Owing to its properties, the bonding glass is suitable for producing a glass-metal composite comprising lightweight metals. Lightweight metals are, as is known, metals including alloys having a density below 5 g/cm$^3$. Exemplary lightweight metals for producing exemplary embodiments of glass-metal composites disclosed herein are magnesium and magnesium alloys, titanium and titanium alloys and also aluminum and aluminum alloys.

It is common to lightweight metals that they usually can withstand thermal stresses to only a limited extent. Aluminum and aluminum alloys can be heated to not more than about 600° C. before the components consisting of aluminum soften and become unusable for the application.

In some embodiments, glass-metal composites comprising steel and/or copper and/or copper alloys and/or AlSiC are produced using the bonding glass disclosed herein. It is possible to join a component composed of one of the metals mentioned to a component or component section composed of one of the other metals mentioned using the bonding glass. A glass-metal composite which at one interface has a bond to one of the metals mentioned and at the other interface has a bond to the same metal or a different metal is then present. The glass-metal composite described profits particularly from the above-described improved properties of the bonding glass.

Apart from the glass or the glass composition and the glass-metal composite, the present disclosure also provides a feedthrough, such as an electrical feedthrough, and/or an electrical and/or electronic and/or electrochemical device. Also disclosed herein is a battery, such as a lithium ion battery, a rechargeable battery, a rechargeable lithium ion battery, a capacitor, a supercapacitor, a sensor housing, an actuator housing, a microcontroller housing and/or a medical implant which can be introduced into a human or animal body and/or can be attached to a human or animal body and/or a diagnostic and/or therapeutic instrument.

Although frequently described here by way of example for battery feedthroughs, the present disclosure is not restricted to such applications. The glass compositions can be used in feedthroughs of any type, such as in those in which the main element and/or the housing, and optionally also the conductor, is a lightweight metal, such as aluminum or titanium, or alloys thereof. Conceivable feedthroughs are feedthroughs for, for example, components, such as electronic components, which are used in lightweight construction, for example in aircraft construction, in spaceflight, and, which require a sufficient heat resistance. Electronic components can, for example, be sensors and/or actuators.

Feedthroughs, such as battery feedthroughs, which may be for a lithium ion battery, such as a rechargeable lithium ion battery, have a main element which has at least one opening through which a conductor, which may be an essentially pin-shaped conductor, is passed through in a glass material having the composition disclosed herein, where the main element may comprise a low-melting material, such as a lightweight metal, which may be aluminum, AlSiC, magnesium or titanium. Alloys, such as lightweight metal alloys, which may be aluminum alloys, magnesium alloys or titanium alloys, for example Ti6246 or Ti6242, are also conceivable. Titanium is a material which is compatible with the human body, so that it is used for medical applications, for example in prosthetics and/or therapy and/or diagnostics. It is likewise frequently used in certain applications because of the particular strength, resistance and low weight, for example in racing but also for aerospace applications.

Further materials for the main element and/or housing, such as a battery housing, are metals, such as steel, rust-free steel, stainless steel or tool steel which is intended for future heat treatment. Stainless steels which can be used are, for example, X12CrMoS17, X5CrNi1810, XCrNiS189, X2CrNi1911, X12CrNi177, X5CrNiMo17-12-2, X6CrNiMoTi17-12-2, X6CrNiTi1810 and X15CrNiSi25-20, X10CrNi1808, X2CrNiMo17-12-2, X6CrNiMoTi17-12-2. In order to be able to provide particularly good weldability both in laser welding and also in resistance welding, stainless steels may be employed, such as Cr—Ni steels having the material numbers (MNo.) in accordance with European standard (EN) 1.4301, 1.4302, 1.4303, 1.4304, 1.4305, 1.4306, 1.4307, as material for the main element and/or the housing part, such as the battery cell housing. As normal steel, it is possible to employ St35, St37 or St38.

The bonding glass in a glass-metal composite, which may be included in a feedthrough, can, in some embodiments, be covered at least in sections by a covering glass or covering polymer. The covering glass may have a higher chemical resistance than the bonding glass, such as a higher water resistance.

The covering glass may be a titanate glass. In some embodiments, the titanate glass contains, in % by weight on an oxide basis, 4% or more of $TiO_2$, such as 13-28% by weight of $TiO_2$. The titanate glass may be an alkali metal silicate titanate glass containing 13-18% by weight of $TiO_2$ and an alkali content in the range of 22-52% by weight and $SiO_2$ in the range of 24-44% by weight.

The covering glass in the form of a titanate glass may contain or consist of the following components in % by weight on an oxide basis:

| | |
|---|---|
| $TiO_2$ | 4-28; |
| $SiO_2$ | 24-44; |
| $Li_2O$ | 0-3, such as 1-3; |
| $K_2O$ | 10-27; and |
| $Na_2O$ | 12-22. |

The above covering glass in the form of a titanate glass may further comprise the following components in % by weight on an oxide basis:

| | |
|---|---|
| $B_2O_3$ | 0-<3; |
| $Al_2O_3$ | 0-2, such as 0-<2; |
| BaO | 0-<11; |
| CaO | 0-1; |
| CuO | 0-<7; |
| $Fe_2O_3$ | 0-<5; |
| MgO | 0-<0.5; |
| $P_2O_5$ | 0-3, such as 1-3; |
| PbO | 0-<0.5; |
| $Sb_2O_3$ | 0-<7; |
| $SnO_2$ | 0-<4; |
| SrO | 0-<2.5, such as 0-<2 or 0-0.05; |
| $V_2O_5$ | 0-13, such as 1-13 or >5-13; |
| $ZrO_2$ | 0-1; and |
| $Bi_2O_3$ | 0-19, such as 0-18 or 0-<10. |

The glazing-in of the conductor into the opening for producing a feedthrough can then be carried out as follows:

The glass material formed according to the present disclosure is firstly introduced together with the pin-shaped conductor into the opening in the main element. The glass is then heated together with the conductor, which may be a pin-shaped conductor, to, for example, the fusion temperature of the glass, so that the glass material softens and encloses the conductor, in the opening and lies against the main element. Since the melting point of both the material of the main element and also of the conductor, which may be a pin-shaped conductor, is above the fusion temperature of the glass material, the main element and also the pin-shaped conductor are present in the solid state. The fusion temperature of the glass material may be from 20 to 150 K below the melting point of the material of the main element and the pin-shaped conductor. If, for example, aluminum is used as lightweight metal with a melting point of $T_{melting}=660.32°$ C., the fusion temperature of the glass material may be in the range from 350° C. to 640° C., such as in the range from 350° C. to 600° C., in the range from 350° C. to <580° C., or in the range from 450° C. to <560° C. As an alternative to a lightweight metal such as aluminum, an aluminum alloy, magnesium, a magnesium alloy, titanium, a titanium alloy, an SiC matrix infiltrated with Al may also be used as material for the main element. An SiC matrix infiltrated with Al is also referred to as AlSiC. AlSiC has an SiC core into which Al has diffused. The properties, in particular the coefficient of expansion, can be set via the proportion of Al. In particular, AlSiC has a lower thermal expansion than pure aluminum.

If the lightweight metals are additionally employed as materials for the conductor, for example the pin-shaped conductor or the electrode connecting component, the lightweight metals may also have a specific electrical conductivity in the range from $5 \cdot 10^6$ S/m to $50 \cdot 10^6$ S/m.

Other exemplary materials are steel, nonrusting steel or stainless steel.

The material of the conductor, such as the pin-shaped conductor, can be identical to the material of the main element, e.g., aluminum or AlSiC. In such an instance, the coefficient of expansion of the main element and metal pin is identical. The coefficient of expansion α of the glass or glass-ceramic material then can be matched to only one material. Furthermore, the external conductor can comprise stainless steel or steel.

As an alternative, the conductor, such as the pin-shaped conductor, can comprise Cu, CuSiC or copper alloys, Mg or magnesium alloys, gold or gold alloys, silver or silver alloys, NiFe, an NiFe jacket with a copper interior and also a cobalt-iron alloy.

Aluminum or aluminum alloys, which may be used for the conductor, include:
EN AW-1050 A
EN AW-1350
EN AW-2014
EN AW-3003
EN AW-4032
EN AW-5019
EN AW-5056
EN AW-5083
EN AW-5556A
EN AW-6060
EN AW-6061.

Copper or copper alloys which may be used for the conductor include:
Cu-PHC 2.0070
Cu-OF 2.0070
Cu-ETP 2.0065
Cu-HCP 2.0070
Cu-DHP 2.0090

Feedthroughs, such as battery feedthroughs, comprising the glass composition formed according to the present disclosure allow glazing-in into a low-melting main element and sufficient resistance, for example to water and/or a battery electrolyte, being ensured.

An improved chemical stability to aqueous media and also nonaqueous, generally aggressive, battery electrolytes is ensured for the phosphate glasses formed according to the present disclosure.

The resistance of the glasses formed according to the present disclosure to the battery electrolytes can be tested by milling the glass composition to give a glass powder having a particle size d50=10 μm and storing this in the electrolyte for a predetermined time, for example one week. d50 means that 50% of all particles or grains of the glass powder are smaller than or equal to a diameter of, for example, 10 μm. A carbonate mixture of ethylene carbonate and dimethyl carbonate in a ratio of 1:1 with one mole of $LiPF_6$ as electrolyte salt, for example, is used as nonaqueous electrolyte. After the glass powder has been exposed to the electrolyte, the glass powder can be filtered off and the electrolyte can be analysed for glass constituents leached from the glass.

Further, the glass composition formed according to the present disclosure, which can be used in a battery feedthrough with one or more pins composed of aluminum, allows fusion of the glass with the surrounding lightweight metal or the metal of the conductor, which may be in the form of a metal pin, to be carried out under a gas atmosphere which is not a protective gas atmosphere. A vacuum is also not necessary for Al fusions. Rather, such fusion can also be carried out under air.

For both types of fusion, $N_2$ or Ar can be utilized as protective gas. As pretreatment for fusion, the metal is cleaned and/or pickled, oxidized in a targeted manner, or coated, if necessary.

An alternative test for resistance to the electrolyte is, for example, carried out by producing a glass piece having a size of 8×8×2 mm and evaluating it visually and also by quantitative analysis of the electrolyte test solution for components leached from the test specimen, i.e. contents of alkali metals Li, Na, K, Cs and also P and Bi after 10 days, 20 days, 30 days and not more than 40 days.

If the dissolution of the test specimen has progressed to too great an extent, the test in the electrolyte is stopped prematurely and the day of stoppage is recorded.

Apart from the resistance to electrolytes, the glasses formed according to the present disclosure were also examined for their water resistance or moisture resistance.

The resistance to moisture was determined as follows. Two glass pieces having a size of 8×8×2 mm were stored at 85° C. and 85% relative humidity in an air-conditioned cabinet for 50 days. The resistance was then evaluated visually using the 4-eye principle after in each case from 2 to 3 days.

The bonding glasses formed according to the present disclosure surprisingly display a high water resistance and at the same time a high chemical stability towards nonaqueous and also water-containing electrolytes and also a high coefficient of thermal expansion. This is particularly surprising because it is assumed that the higher the coefficient of thermal expansion, the more unstable the glass becomes. It is therefore surprising that, despite the high coefficient of expansion and the low fusion temperature, the glasses formed according to the present disclosure have an improved stability.

As stated above, the glasses display a surprising and noticeably improved water resistance. This improvement can be attributed to the above-described presence of R oxide. This effect is surprising because it is assumed that glass materials having a high thermal expansion must also have looser bonds within the glass network and the abovementioned R oxide apparently stabilizes the glass network, in conjunction with $Bi_2O_3$, without hindering the thermal expansion. Such an effect was not foreseeable. Likewise, the bonding glasses formed according to the present disclosure made it possible to produce a hermetically sealed connection, such as to the metals mentioned.

The present disclosure likewise provides for the glass composition to be additionally provided with fillers, for example, for expansion matching, i.e. to match the coefficient of expansion. This makes lowering of the coefficient of thermal expansion possible.

In order to enable the glass composition to be heated by IR heating, the abovementioned glasses can be provided with dopants which have an emission maximum in the range of infrared radiation, such as IR radiation of an IR source. Exemplary materials for this purpose are Fe, Cr, Mn, Co, V, pigments. The glass material which has been treated in this way can be heated locally in a targeted manner by the infrared radiation.

Furthermore, the feedthrough, which may be a battery or capacitor or supercapacitor feedthrough, comprising the glasses disclosed herein has a high heat resistance, in particular temperature change resistance, compared to known feedthroughs, in particular those having polymer as sealing material. A hermetic seal is provided even in the event of a temperature change or when changes in the temperature occur. The hermetic seal ensures that no liquid, such as battery liquid, can exit and/or moisture penetrates into the housing. For the purposes of the present disclosure, a hermetic seal means that the helium leakage rate is $<1 \cdot 10^{-8}$ mbar 1s$^{-1}$, such as $<1 \cdot 10^{-9}$ mbar 1 s$^{-1}$, at a pressure difference of 1 bar.

Furthermore, the bonding glass, the joint and/or the feedthrough, which may be a capacitor and/or supercapacitor and/or battery feedthrough, has a satisfactory chemical resistance to, for example, water and at least the nonaqueous electrolytes examined.

The feedthroughs comprising the glass composition formed according to the present disclosure or the bonding glasses can be employed in electrical devices, such as a storage device, which may be a battery and/or a battery cell. The housing of the battery cell may consist of the same material as the main element of the feedthrough, such as a lightweight metal. The main element may be in the case of battery cells, part of the battery housing. The battery may be a lithium ion battery.

The battery and/or the capacitor and/or the supercapacitor can have a water-containing electrolyte or a nonaqueous electrolyte. The nonaqueous electrolytes can be based on carbonate, such as a carbonate mixture. The carbonate mixture can comprise ethylene carbonate in a mixture with dimethyl carbonate and an electrolyte salt, for example $LiPF_6$. An example of such an electrolyte is the generally known battery electrolyte LP30. Another known class of battery electrolytes comprise water together with adipic acid and ammonia. The resistance of the bonding glass formed according to the present disclosure to water and this electrolyte was tested, as described herein.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
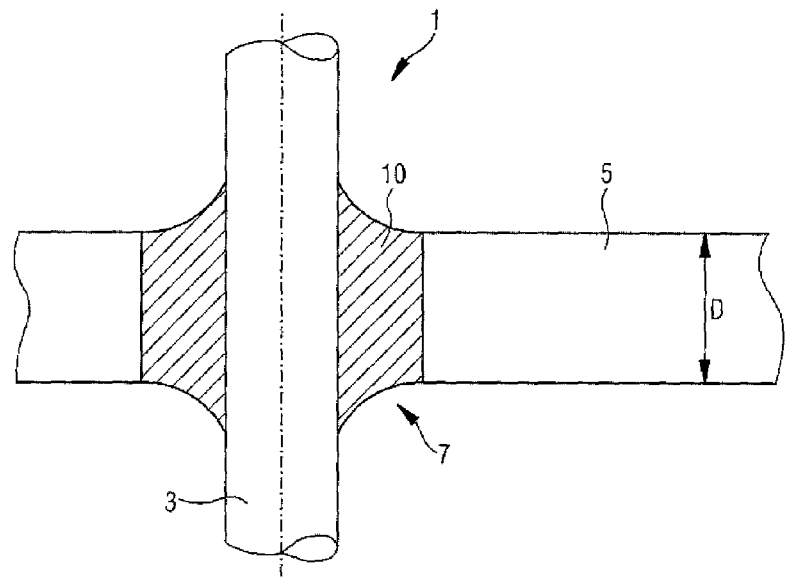
FIG. 1 is a cross-sectional view of an exemplary embodiment of a feedthrough formed according to the present disclosure.

Table 1 shows working examples of compositions formed according to the present disclosure of the bonding glass in mol % on an oxide basis, with WE denoting a working example of a bonding glass formed according to the present disclosure.

In Table 2, bonding glasses which are not formed according to the present disclosure have been examined as comparative examples, with CE denoting a comparative example.

The water resistance of all working examples was determined as described previously. According to the test results, a classification of the water resistance as good, satisfactory and unsatisfactory was made. The evaluation of the resistance was effected visually by the 4-eye principle:
Good: Specimen geometry and colour unchanged
Satisfactory: Specimen of defined geometry, slight colour & transparency change
Unsatisfactory: Sample geometry and colour changed The resistance to LP 30 and the water-containing electrolyte described were likewise determined for most of the bonding glasses formed according to the present disclosure.

The glasses were examined in respect of electrolyte resistance using an 8×8×2 mm glass piece. The examination was carried out on the basis of the components leached from the test specimen, in particular alkali metals Li, Na, K and/or P and/or Bi after 10, 20, 30 and not more than 40 days.

The evaluation of the resistance was effected visually according to the 4-eye principle:
The bulk material was categorized as follows:
Good: Specimen geometry and colour unchanged
Satisfactory: Specimen of defined geometry, slight colour & transparency change
Unsatisfactory: Specimen geometry and colour changed The electrolyte solution was likewise categorized visually:
Good: Electrolyte: NO colour change
Satisfactory: Electrolyte: slight colour change
Unsatisfactory: Electrolyte: dark coloration

TABLE 1

| | \multicolumn{11}{c}{Working Examples} | | | | | | | | | | |
|---|---|---|---|---|---|---|---|---|---|---|---|
| | WE1 | WE2 | WE3 | WE4 | WE5 | WE6 | WE7 | WE8 | WE 9 | WE10 | WE11 |
| $B_2O_3$ | 6.2 | 6.2 | 6.1 | 5.85 | 6.1 | 6.5 | 5.9 | 6.15 | 6.15 | 6.25 | 6 |
| $Al_2O_3$ | 12.15 | 12.25 | 11.85 | 12.2 | 12.35 | 12.5 | 11.2 | 12.1 | 12 | 12.05 | 12.1 |
| $P_2O_5$ | 40.55 | 38 | 39.5 | 38.2 | 38.3 | 38.7 | 41.7 | 41.7 | 41.7 | 41.6 | 41.75 |
| $Bi_2O_3$ | 3.45 | 3.75 | 2.85 | 3.7 | 3.8 | 3.8 | 3.4 | 4.4 | 4.4 | 4.5 | 4.4 |
| $Li_2O$ | | | | | | | | | | | |
| $Na_2O$ | 15.9 | 16.8 | 15.9 | 16.45 | 16 | 20.4 | 16.1 | 16.05 | 16.2 | 15.9 | 16.1 |
| $K_2O$ | 17.65 | 18.7 | 18.85 | 19 | 19 | 13.3 | 17.5 | 17.65 | 17.5 | 17.7 | 17.7 |
| BaO | | | | | | | | | | | |
| CaO | 0.1 | 0.15 | 0.15 | 0.3 | 0.15 | 0.1 | | | | | |
| $MnO_2$ | 3.75 | 3.9 | 4.5 | 4 | 4.05 | 4.4 | | | | | |
| $SiO_2$ | 0.25 | 0.25 | 0.3 | 0.3 | 0.25 | 0.3 | 4.2 | 0.05 | 0.05 | 0.15 | 0.15 |
| $GeO_2$ | | | | | | | | | | | |
| $SnO_2$ | | | | | | | | | | 2 | |
| $Fe_2O_3$ | | | | | | | | | | | 1.8 |
| $Ta_2O_5$ | | | | | | | | 1.9 | | | |
| $Nb_2O_5$ | | | | | | | | | | 1.85 | |
| PbO | | | | | | | | | | | |
| Total | 100 | 100 | 100 | 100 | 100 | 100 | 100 | 100 | 100 | 100 | 100 |
| Total R oxide | 4.1 | 4.3 | 4.95 | 4.6 | 4.45 | 4.8 | 4.2 | 1.95 | 2.05 | 2 | 1.95 |
| Tg [° C.] | 401 | 407 | 411 | 409 | 404 | 425 | 411 | 421 | 416 | 422 | 413 |
| Sft [° C.] | | 567 | | | | | | | | | |
| CTE[25; 300] | 16.2 | 16.23 | 15.48 | 16.22 | 16.16 | 15 | 16.4 | 15.5 | 16.1 | 16 | 15.8 |
| CTE[25; Tg] | 18.7 | | | | | | | | | | |
| Water resistance | good | good | good | good | good | good | good | good | good | good | good |
| Water-containing electrolyte | good | good | | | | | good | good | good | good | satisfactory |
| LP 30 | good | good | | | | | good | good | good | good | good |

| | WE12 | WE13 | WE14 | WE15 | WE16 | WE17 | WE18 | WE19 | WE20 | WE21 | WE22 |
|---|---|---|---|---|---|---|---|---|---|---|---|
| $B_2O_3$ | 6.3 | 7 | 7 | 5.2 | 7 | 6.9 | 6.9 | 6.9 | 6.9 | 6.9 | 5.85 |
| $Al_2O_3$ | 12.2 | 13 | 13 | 11.1 | 13 | 13 | 13 | 13 | 13 | 13 | 12.5 |
| $P_2O_5$ | 41.4 | 36.1 | 39.3 | 42 | 39.3 | 39.3 | 39.3 | 39.3 | 39.5 | 39.5 | 38.75 |
| $Bi_2O_3$ | 3.6 | 5.8 | 5.8 | 4.6 | 5.8 | 5.8 | 5.8 | 5.8 | 5.8 | 5.8 | 3.85 |
| $Li_2O$ | | | | | | | | | | | |
| $Na_2O$ | 15.9 | 20.4 | 20.4 | 21.3 | 20.4 | 20.4 | 20.4 | 20.4 | 20.4 | 20.4 | 17.25 |
| $K_2O$ | 18 | 14.38 | 14.38 | 12.5 | 14.38 | 14.4 | 14.3 | 14.3 | 14.3 | 14.3 | 16.3 |
| BaO | | | | | | | | | | | |
| CaO | | | 0.12 | 0.12 | 0.1 | 0.12 | | | | | 0.1 |
| $MnO_2$ | | 3.2 | | 3.2 | | | | | | | 4 |
| $SiO_2$ | 0.05 | | | | | | | | | | 1.4 |
| $GeO_2$ | 2.55 | | | | | 0.2 | | | | | |
| $SnO_2$ | | | | | | | 0.3 | | | | |
| $Fe_2O_3$ | | | | | | | | 0.3 | | | |
| $Ta_2O_5$ | | | | | | | | | 0.1 | | |
| $Nb_2O_5$ | | | | | | | | | | 0.1 | |
| PbO | | | | | | | | | | | |
| Total | 100 | 100 | 100 | 100 | 100 | 100 | 100 | 100 | 100 | 100 | 100 |
| Total R oxide | 2.6 | 3.32 | 0.12 | 3.3 | 0.12 | 0.2 | 0.3 | 0.3 | 0.1 | 0.1 | 5.5 |

TABLE 1-continued

| | Working Examples | | | | | | | | | | |
|---|---|---|---|---|---|---|---|---|---|---|---|
| Tg [° C.] | 420 | | | | | | | | | | |
| Sft [° C.] | | | | | | | | | | | |
| CTE[25; 300] | 16 | 16.6 | 16.6 | 15.8 | 16.3 | 16.3 | 16.2 | 16.2 | 16.2 | 16.2 | 15.7 |
| CTE[25; Tg] | | | | | | | | | | | |
| Water resistance | good | good | good | good | good | good | good | good | good | good | good |
| Water-containing electrolyte | unsatisfactory | | | | | | | | | | |
| LP 30 | good | | | | | | | | | | |

In Table 2, "G" denotes "good," "S" denotes "satisfactory," and "U" denotes "unsatisfactory".

TABLE 2

| | Comparative Examples | | | | | | | | | |
|---|---|---|---|---|---|---|---|---|---|---|
| | CE1 | CE2 | CE3 | CE4 | CE5 | CE6 | CE7 | CE8 | CE9 | CE10 |
| $B_2O_3$ | 6 | 5.8 | 7.6 | 5.4 | 5 | 3.6 | 6.9 | 4.8 | 7.6 | 4.7 |
| $Al_2O_3$ | 12 | 12.3 | 4.2 | 2 | 9 | 10.75 | 13 | 8.6 | 4.2 | 8.7 |
| $P_2O_5$ | 40 | 43.55 | 46.5 | 46.4 | 36.6 | 48.1 | 39.5 | 43.3 | 47.5 | 43.3 |
| $Bi_2O_3$ | 0 | 4.4 | 1 | 1.4 | 2 | 3.9 | 5.8 | 0 | 0 | 0 |
| $Li_2O$ | | | | | | 7.7 | | | | 17.3 |
| $Na_2O$ | 15 | 15.8 | 28.3 | 28.4 | 15 | 16.1 | 20.4 | 17.3 | 28.3 | |
| $K_2O$ | 18 | 18.05 | 12.4 | 16.3 | 19.5 | 17.5 | 14.4 | 17.3 | 12.4 | 17.3 |
| BaO | | | | | | | | 8.7 | | 8.7 |
| CaO | | | | 0.05 | | | | | | |
| $SiO_2$ | | 0.1 | | 0.05 | | 0.05 | | | | |
| ZnO | | | | | | | | | | |
| $Cs_2O$ | | | | | | | | | | |
| PbO | 9 | | | | 5.2 | | | | | |
| Total | 100 | 100 | 100 | 100 | 100 | 100 | 100 | 100 | 100 | 100 |
| Total R oxide | 0 | 0.1 | 0 | 0.1 | 0 | 0.05 | 0 | 0 | 0 | 0 |
| Tg [° C.] | 401 | 425 | 339 | 286 | 334 | 407 | | 375 | 325 | 354 |
| CTE[25; 300] | 16.3 | 15.9 | 19.7 | | 19.2 | 16.7 | 16.4 | 16.5 | 19 | 14.9 |
| CTE[25; Tg] | | | | 23.8 | | | | | | |
| Water resistance | S | S | U | U | U | U | S | U | U | U |
| Water-containing electrolyte | U | S | U | U | S | G | | | | |
| LP 30 electrolyte | G | U | G | G | G | G | | | | |

| | CE11 | CE12 | CE13 | CE14 | CE15 | CE16 | CE17 | CE18 | CE19 |
|---|---|---|---|---|---|---|---|---|---|
| $B_2O_3$ | 4.8 | 4.8 | 5.2 | 1.8 | 4.7 | 8.9 | 9.4 | 13.6 | 8.7 |
| $Al_2O_3$ | 2 | 2 | 12.7 | 9.4 | 9.5 | 6.6 | 6.35 | 5 | 6.4 |
| $P_2O_5$ | 43.3 | 37.1 | 39.5 | 38.4 | 37.9 | 35.5 | 35.35 | 32.7 | 32.8 |
| $Bi_2O_3$ | | | 2.9 | 2.3 | | 2 | 3.9 | 4 | 3.3 |
| $Li_2O$ | 34.6 | 42.1 | | | | 6.9 | | | 7.4 |
| $Na_2O$ | | | 16.5 | 19.8 | 16.4 | 23.1 | 32.3 | 26.2 | 17.9 |
| $K_2O$ | | | 19 | 17.9 | 19.1 | 17 | 11.2 | 18.5 | 23.5 |
| BaO | 15.3 | 14 | | | | | | | |
| CaO | | | | | | | | | |
| $SiO_2$ | | | 0.1 | 0.1 | | | 1.5 | | |
| ZnO | | | | 10.3 | 12.4 | | | | |
| $Cs_2O$ | | | 4.1 | | | | | | |
| PbO | | | | | | | | | |
| Total | 100 | 100 | 100 | 100 | 100 | 100 | 100 | 100 | 100 |
| Total R oxide | 0 | 0 | 0.1 | 10.4 | 12.4 | 0 | 1.5 | 0 | 0 |
| Tg [° C.] | 369 | 359 | 367 | 341 | 360 | 350 | 349 | | |
| CTE[25; 300] | 13.7 | 14.8 | 19.1 | 18.9 | 17.4 | 21 | 19.9 | 21.0 | 22.9 |
| CTE[25; Tg] | | | | | | | | | |
| Water resistance | U | U | U | U | U | U | U | U | U |
| Water-containing electrolyte | | | | | | | S | | |
| LP 30 Electrolyte | | | G | G | G | U | S | | |

All working examples of the bonding glasses formed according to the present disclosure display good water resistance. This applies for all of the R oxides mentioned. It is noted that although good water resistances are achieved in the case of WE11 and WE12, the resistance to water-containing electrolytes is significantly poorer. This shows that attack of water-containing electrolytes on the bonding glass occurs not only via the water, but likewise via the electrolyte salts and also the other substances present in the electrolyte. However, the bonding glasses corresponding to WE11 and WE12 also have good resistance to the nonaqueous electrolyte LP30. However, CE5 and CE17 show that the resistance of bonding glasses to water-containing electrolytes can be much better than that to water.

Tables 1 and 2 likewise show the values for Tg. Tg is simple to determine and gives an indication of the fusion or processing temperature. Although Tg is significantly below these, the lower the Tg, the lower is the fusion or processing temperature, too. Since in all working examples Tg is far below the melting point of, in particular, lightweight metals, these are also suitable for producing joints to lightweight metals and/or metals having a similarly low melting point.

All bonding glasses formed according to the present disclosure in Table 1 display high expansion, i.e. they have a CTE which makes them suitable for producing joints to the metals mentioned, such as lightweight metals.

Furthermore, all bonding glasses formed according to the present disclosure in Table 1 bond to the metals mentioned, in particular lightweight metals, so well that a hermetic seal between bonding glass and metal is formed.

The bonding glasses formed according to the present disclosure thus simultaneously satisfy many requirements, such as good water resistance, a high CTE and a low processing temperature or Tg, which make it possible to produce joints with the metals mentioned, such as lightweight metals, and also good resistance to the nonaqueous electrolyte LP30 and, in some embodiments, good resistance to water-containing electrolytes.

Comparison of the working examples formed according to the present disclosure in Table 1 with the comparative examples in Table 2 shows that, despite similar base glass systems, the presence of the abovementioned R oxide leads to a very significant improvement in the water resistance. Interestingly, all comparative examples in Table 2 display satisfactory water resistances at best, some comparative examples display unsatisfactory water resistance.

When, for example, WE2 is compared with CE2, it is found that the $P_2O_5$ content differs significantly: in the case of CE2, the P2O5 content is greater than that of glass formed according to the present disclosure and the glass has a significantly lower water resistance and an unsatisfactory resistance to LP30.

Table 2 shows the comparative examples CE1 to CE19, which represent bonding glasses which are not formed according to the present disclosure. The water resistance of the bonding glasses of all the comparative examples CE1 to CE19 are not more than satisfactory. Some are even unsatisfactory. In comparison, the bonding glasses formed according to the present disclosure comprising the R oxide as a constituent of the composition have an at least good water resistance, which is thus significantly improved compared to the prior art. CE18 and CE19 even devitrify during production of the joint and are therefore unusable for producing the latter.

On the other hand, if the proportion of $P_2O_5$ is reduced, an improved water resistance is expected, but the coefficient of thermal expansion is likewise reduced to such an extent that a bond to lightweight metals is no longer possible.

Most embodiments of the bonding glasses formed according to the present disclosure also have a good resistance to water-containing electrolytes. The same applies to the chemical resistance compared to the above-described nonaqueous electrolytes.

The composition of the bonding glass formed according to the present disclosure is accordingly balanced in such a way that a number of requirements are satisfied simultaneously. These are, in particular, the water resistance, the coefficient of thermal expansion and, in some embodiments, the chemical compatibility with lightweight metals, which is a prerequisite for producing a joint. In some applications, the bonding glass has to be able to wet the lightweight metal. There is an interaction between all the abovementioned components of a bonding glass formed according to the present disclosure, which leads to the abovementioned prerequisites being satisfied. The present disclosure provides, in some embodiments, a composition range for bonding glasses having improved water resistance and the coefficient of thermal expansion of which makes production of joints to lightweight metals possible.

Close examination of the working examples shows that a complex interaction of the components, such as $P_2O_5$ and the alkali metals, and also $Bi_2O_3$ and R oxide, has to be in the indicated composition ranges, which results in the improvement in the water resistance compared to the comparative examples and thus to the bonding glasses known from the prior art.

Owing to the complexity of this interaction, the result is surprising and was not foreseeable.

Referring now to FIG. 1, an exemplary embodiment of a feedthrough 1 formed according to the present disclosure is illustrated. The feedthrough 1 comprises as a conductor, which may be a pin-shaped conductor, a metal pin 3 which may consist of one material, for example aluminum or copper, and also, as main element 5, a metal part which, in some embodiments, consists of a low-melting metal, i.e. a lightweight metal, such as aluminum. The metal pin 3 is passed through an opening 7 which goes through the metal part 5. Although only a single metal pin going through the opening is shown, it is also possible for a plurality of metal pins to be passed through the opening.

The outer contour of the opening 7 can be round or oval. The opening 7 goes through the entire thickness D of the main element or metal part 5. The metal pin 3 is fused into a glass material 10 and is passed in the glass material 10 through the opening 7 through the main element 5. The glass material 10 is the bonding glass formed according to the present disclosure. The opening 7 is introduced into the main element 5 by, for example, a parting process, such as stamping. In order to provide a hermetic seal where the metal pin 3 is passed through the opening 7, the metal pin 3 is fused into a glass plug composed of the glass material 10 formed according to the present disclosure. This method of production avoids squeezing-out of the glass plug together with metal pin from the opening 7, even under increased loads on the glass plug, e.g. in the case of a compressive load. The fusion temperature of the glass material formed according to the present disclosure to the main element is from 20 K to 100 K below the melting temperature of the material of the main element 5 and/or of the pin-shaped conductor.

Figure 2:
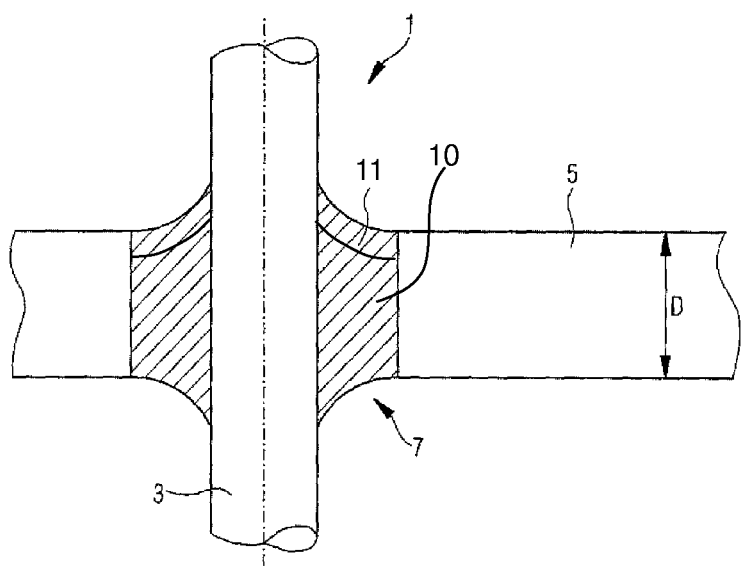
FIG. 2 is a cross-sectional view of an exemplary embodiment of a feedthrough formed according to the present disclosure with a covering material.

The feedthrough depicted in FIG. 2 corresponds to the feedthrough of FIG. 1, except that the covering material 11, which can, as described, be a covering polymer or a covering glass, has been applied to the glass material or glass plug 10. The covering material 11 is, in some embodiments, the previously described titanate glass.

The covering material 11 can be applied to the outside of the feedthrough. The outside is opposite the inside. The inside may be the inside of a housing. The glass material 10 may therefore be in contact with the electrolytes, which may be of a battery and/or a rechargeable battery and/or a capacitor and/or a supercapacitor. The glass material 10 of the glass plug consequently has to be resistant to this electrolyte. As stated above, the bonding glass formed according to the present disclosure is resistant to water and to the water-containing and/or nonaqueous electrolytes examined. The covering material 11 on the outside does not come into contact with the electrolytes, but instead with the environmental conditions. Accordingly, the covering material 11 can be optimized for different properties, e.g. for further-improved water resistance, for impact strength, for abrasion resistance, etc. The titanate glass described is, for example, not as resistant to water-containing and nonaqueous electrolytes as the bonding glass formed according to the present disclosure, but may be even more water-resistant.

The composition of the bonding glass formed according to the present disclosures as described herein provides very high coefficients of thermal expansion which are in the range from $14 \cdot 10^{-6} K^{-1}$, such as in the range from $15 \cdot 10^{-6} K^{-1}$, to $17 \cdot 10^{-6} K^{-1}$ for temperatures in the range from 20° C. to 300° C. and thus in the region of the thermal expansion of lightweight metals such as aluminum, but also of similar metals for the essentially pin-shaped conductors 11 which are passed through the glass material, for example copper. Thus, aluminum has a thermal expansion $\alpha = 23 \cdot 10^{-6} K^{-1}$, copper of $16.5 \cdot 10^{-6} K^{-1}$, at room temperature. In order to prevent the lightweight metal of the main element, and possibly also of the metal pin, from melting or deforming during glazing-in, the melting temperature of the glass material is below the melting temperature of the material of the main element and/or conductor.

The fusion temperature of the glass composition to be used is then in the range from 250° C. to 650° C. The glazing-in of the essentially pin-shaped conductor 3 into the main element 5 before seating of the feedthrough in the opening 7 is achieved by the glass being heated together with the conductor, such as the pin-shaped conductor, to the fusion temperature of the glass, so that the glass material softens and encloses the conductor in the opening and lies against the main element 9. If, as indicated above, aluminum is, for example, employed as lightweight metal having a melting point $T_{melting} = 660.32°$ C. for the main element 9, the fusion temperature of the glass material may be, as indicated above, in the range from 350° C. to 640° C.

The material of the pin-shaped conductor 3 may be identical to the material of the main element, or at least belongs to the same class of materials. The material of the conductor can be, particularly in electrochemical applications, selected according to the electrolytes used and the function in the cell. The pin-shaped conductor can comprise aluminum, an aluminum alloy, AlSiC, copper, a copper alloy, CuSiC alloys or NiFe alloys, a copper core material, e.g., an NiFe jacket having a copper interior, or CF25, i.e., a cobalt-iron alloy, silver, a silver alloy, gold or a gold alloy as material.

The feedthrough described herein is suitable for a pressed glazing-in. Here, the bonding glass is placed together with the at least one conductor in a housing part and/or main element and then heated so that all elements fuse together. During cooling, the bonding glass solidifies and the housing part and/or main element contracts more strongly than the glass. Owing to the different coefficients of thermal expansion of the materials used, the bonding glass is placed under compression in the opening of the feedthrough and forms a seal. The coefficient of thermal expansion of the joining partner, here generally the metal, in particular the lightweight metal, is greater than that of the bonding glass.

The glass embedding comprising the glass material indicated in Table 1 forms, as described above, a hermetic seal. This applies particularly to feedthroughs produced using the glass materials indicated. All glasses indicated were tested in feedthroughs with aluminum as material of the main element and were found to form a hermetic seal.

A lightweight metal such as aluminum (Al), AlSiC, an aluminum alloy, magnesium, a magnesium alloy, titanium and/or a titanium alloy may be employed as material for the main element. Alternative materials for the main element are metals such as steel, rust-free steel, stainless steel or tool steel.

The glass compositions formed according to the present disclosure provide bonding glasses, which may be used in joints to lightweight metals, having a low process temperature, a fusion temperature which is lower than the melting point of aluminum, a high coefficient of expansion $\alpha$ and an excellent resistance to battery electrolytes and significantly improved water resistance. Although the glass compositions have been described for use in feedthroughs, such as battery feedthroughs, they are not restricted thereto; other fields of application are, for example, the sealing of housings, of sensors and/or actuators or else capacitors and/or supercapacitors. In principle, the feedthroughs are suitable for all purposes in lightweight construction, in particular as feedthroughs in electric components which have to be light and heat-resistant. Such components occur, for example, in aircraft construction and in space flight. Use in medical technology, such as in diagnostic instruments and/or in implants, is likewise possible.

The high-expansion bonding glasses formed according to the present disclosure are much more resistant to water than known high-expansion bonding glasses. It is presumed that this is a result of the interplay between $Bi_2O_3$ and the R oxide described, which apparently stabilize, at least in regions, the network of the glass matrix so that the sensitive constituents thereof, such as phosphorus constituents thereof, are not leached out, or at least leached out less readily. At the same time, the bonding glasses formed according to the present disclosure can form a particularly hermetic seal with lightweight metals. This makes the bonding glasses formed according to the present disclosure useful in highly stressed and/or mass-produced products, for example in medical products and/or batteries for electromobility.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A bonding glass which has a coefficient of thermal expansion $\alpha(25\text{-}300)$ of from $14 \cdot 10^{-6} K^{-1}$ to $17 \cdot 10^{-6} K^{-1}$, comprising a composition in mol % on an oxide basis of:

| | |
|---|---|
| $B_2O_3$ | 4-8; |
| $Al_2O_3$ | 10-14; |
| $P_2O_5$ | 36-43; |
| $Na_2O$ | 15-22; |
| $K_2O$ | 12.5-20; |
| $Bi_2O_3$ | 2-6; and |
| R oxide | >0-6, | wherein R oxide is an oxide selected from the group consisting of $MnO_2$, $SiO_2$, $SnO_2$, $Ta_2O_5$, $Nb_2O_5$, $Fe_2O_3$, $GeO_2$, CaO, and combinations thereof, the composition being free of PbO except for, at most, impurities.

2. The bonding glass according to claim 1, wherein the bonding glass has a glass transition temperature Tg of from 390° C. to 430° C.

3. The bonding glass according to claim 1, wherein R oxide comprises, in mol % on an oxide basis, 3.0-6.0 $MnO_2$.

4. The bonding glass according to claim 3, wherein R oxide comprises, in mol % on an oxide basis, 3.2-4.9 $MnO_2$.

5. The bonding glass according to claim 1, wherein R oxide comprises, in mol % on an oxide basis, at least one of the following oxides:

| | |
|---|---|
| $SiO_2$ | 0.01-1.8; |
| $GeO_2$ | 0.01-2.8; |
| $SnO_2$ | 0.01-2.4; |
| $Fe_2O_3$ | 0.01-2.1; |
| $Ta_2O_5$ | 0.01-2.2; |
| $Nb_2O_5$ | 0.01-2.0; and |
| CaO | 0.01-0.4. |

6. The bonding glass according to claim 1, wherein the composition comprises, in mol % on an oxide basis, at least one of the following oxides:

| | |
|---|---|
| $P_2O_5$ | 36-<42; |
| $B_2O_3$ | 5.5-6.8; |
| $Al_2O_3$ | 11.4-12.8; |
| $Na_2O$ | 15.4-20.9; |
| $K_2O$ | 12.8-19.8; and |
| $Bi_2O_3$ | 2.5-4.5. |

7. The bonding glass according to claim 1, wherein the composition comprises at least one additional alkali metal oxide, other than $Na_2O$ and $K_2O$, and a total content of alkali metal oxides in the composition is at most 36 mol %.

8. The bonding glass according to claim 7, wherein the at least one additional alkali metal oxide is selected from the group consisting of $Li_2O$, $Cs_2O$, and combinations thereof.

9. The bonding glass according to claim 1, wherein the bonding glass has crystalline regions which comprise phosphate-containing crystal phases.

10. The bonding glass according to claim 9, wherein the crystal phases comprise crystals from the group consisting of a $Bi_2O_3$—$P_2O_5$ system, an $R_2O$—$Al_2O_3$—$P_2O_5$ system, and combinations thereof.

11. The bonding glass according to claim 10, wherein the crystal phases comprise crystals from a $K_2O$—$Al_2O_3$—$P_2O_5$ system.

12. The bonding glass according to claim 1, wherein the composition is in the form of a glass powder.

13. The bonding glass according to claim 1, further comprising a metal bonded to the bonding glass to form a glass-metal composite.

14. The glass-metal composite according to claim 13, wherein the metal is one of a lightweight metal and a lightweight metal alloy.

15. The glass-metal composite according to claim 13, wherein the metal is selected from the group consisting of aluminum, aluminum alloys, titanium, titanium alloys, magnesium, magnesium alloys, AlSiC, steel, stainless steel, copper, copper alloys, and combinations thereof.

16. The glass-metal composite according to claim 13, wherein the bonding glass is covered, at least in sections, by a covering glass or a covering polymer.

17. The glass-metal composite according to claim 16, wherein the bonding glass is covered, at least in sections, by a covering glass having a higher water resistance than the bonding glass and comprising a titanate glass.

18. A device, comprising:
a feedthrough, comprising:
at least one main element composed of a metal and which has at least one opening formed therethrough;
a functional element passed through the at least one opening and embedded in a bonding glass in the at least one opening, the bonding glass seals the at least one opening, the bonding glass having a coefficient of thermal expansion $\alpha(25\text{-}300)$ of from $14\cdot10^{-6}K^{-1}$ to $17\cdot10^{-6}K^{-1}$, the bonding glass comprising a composition in mol % on an oxide basis of:

| | |
|---|---|
| $B_2O_3$ | 4-8; |
| $Al_2O_3$ | 10-14; |
| $P_2O_5$ | 36-43; |
| $Na_2O$ | 15-22; |
| $K_2O$ | 12.5-20; |
| $Bi_2O_3$ | 2-6; and |
| R oxide | >0-6, | wherein R oxide is an oxide selected from the group consisting of $MnO_2$, $SiO_2$, $SnO_2$, $Ta_2O_5$, $Nb_2O_5$, $Fe_2O_3$, $GeO_2$, CaO, and combinations thereof, the composition being free of PbO except for, at most, impurities.

19. The device according to claim 18, wherein the bonding glass hermetically seals the at least one opening.

20. The device according to claim 18, wherein the functional element is, at least in a region of the at least one opening, a pin-shaped conductor.

21. The device according to claim 20, wherein the pin-shaped conductor comprises, at least in the region of the at least one opening, at least one of copper and aluminum.

22. The device according to claim 18, wherein the metal is at least one of a lightweight metal and a lightweight metal alloy.

23. The device according to claim 18, further comprising a housing holding the at least one feedthrough.

24. The device according to claim 23, wherein the housing comprises a metal bonded to the bonding glass to form a glass-metal composite.

25. The device according to claim 18, wherein the device is at least one of an electrical device, an electronic device, or an electrochemical device selected from the group consisting of batteries, rechargeable batteries, capacitors, supercapacitors, sensor housings, actuator housings, microcontroller housings, medical implants, articles configured to be installed on a human body or an animal body, diagnostic instruments, and therapeutic instruments.

\* \* \* \* \*